(12) United States Patent
Cobler

(10) Patent No.: US 12,029,209 B2
(45) Date of Patent: *Jul. 9, 2024

(54) INSECT BAIT STAKE

(71) Applicant: Woodstream Corporation, Lancaster, PA (US)

(72) Inventor: David Fletcher Cobler, Etters, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,219

(22) Filed: Jun. 16, 2022

(65) Prior Publication Data

US 2023/0404053 A1 Dec. 21, 2023

(51) Int. Cl.
*A01M 1/20* (2006.01)

(52) U.S. Cl.
CPC .................. *A01M 1/2005* (2013.01)

(58) Field of Classification Search
CPC ............................. A01M 1/2005; A01M 1/10
USPC .......................................................... 43/131
See application file for complete search history.

(56) References Cited

U.S. PATENT DOCUMENTS

| | | | | | |
|---|---|---|---|---|---|
| 2,825,996 | A | * | 3/1958 | Grant .................. | A01M 1/2055 43/131 |
| 5,390,441 | A | * | 2/1995 | Pence ................. | A01M 25/008 43/131 |
| 5,960,585 | A | * | 10/1999 | Demarest ............. | A01M 1/2011 43/131 |
| 2005/0000147 | A1 | * | 1/2005 | Westphal ............. | A01M 1/2011 43/131 |
| 2008/0307695 | A1 | * | 12/2008 | Bernard ............... | A01M 1/2011 43/131 |
| 2014/0338251 | A1 | * | 11/2014 | King ...................... | A01M 1/02 43/131 |

* cited by examiner

*Primary Examiner* — Joshua J Michener
*Assistant Examiner* — Nicole Paige MacCrate
(74) *Attorney, Agent, or Firm* — Barley Snyder

(57) ABSTRACT

An insect bait stake comprises a container defining an internal cavity adapted to hold a quantity of liquid bait. The container includes a first housing defining a first portion of the internal cavity, a second housing attached to the first housing and defining a second portion of the internal cavity, and a tab portion adapted to be removed for exposing the internal cavity to the exterior environment. A first anti-crushing element of the container is arranged within the internal cavity and between the first housing and the second housing. The anti-crushing element fixes a distance between the first housing and the second housing in response to a compressive force placed on the container. A passageway is formed by the container and is in communication with the internal cavity on a first end thereof. The passageway extends through at least one of the first housing or the second housing to the tab portion.

22 Claims, 3 Drawing Sheets

INSECT BAIT STAKE

FIELD OF THE INVENTION

The present disclosure is related to the field of pest control and, more particularly, to insect bait assemblies, for example, ant bait stakes.

BACKGROUND

Numerous types of bait stations have been developed for attracting and killing insects, through providing a supply of bait. The bait is typically doped with an insecticide, and is adapted to attract and kill insects through ingestion of the edible bait.

One such type of bait station comprises a "bait stake" which includes a ground penetrating portion and a reservoir connected thereto for holding a quantity of bait. According to the prior art, bait stakes may be embodied as multi-component assemblies, including for example, a housing and a removable bait package or container. Such arrangements are relatively expensive and/or complex to manufacture. Further, existing solutions have limited bait holding capacity by virtue of their design (e.g., holding bait above the ground only), and are prone to leaking. Many prior art bait stakes are designed to be installed via tools (e.g., a hammer). As a result, at least the top surfaces of these stakes must be stiff and robust. This construction often results in a stake that is difficult to open by a user.

Improved bait stakes which are economical to manufacture and easy to install are desired.

SUMMARY

An insect bait stake according to the present disclosure comprises a container defining an internal cavity adapted to hold a quantity of liquid bait. The container includes a first housing defining a first portion of the internal cavity, a second housing attached to the first housing and defining a second portion of the internal cavity, and a tab portion adapted to be removed for exposing the internal cavity to an exterior environment. A first anti-crushing element of the container is arranged within the internal cavity and between the first housing and the second housing. The anti-crushing element fixes a distance between the first housing and the second housing in response to a compressive force placed on the container. A passageway is formed by the container and is in communication with the internal cavity on a first end thereof. The passageway extends through at least one of the first housing or the second housing to the tab portion.

BRIEF DESCRIPTION OF THE DRAWINGS

The invention will now be described by way of example with reference to the accompanying Figures, of which.

DETAILED DESCRIPTION OF THE EMBODIMENTS

Figure 1:
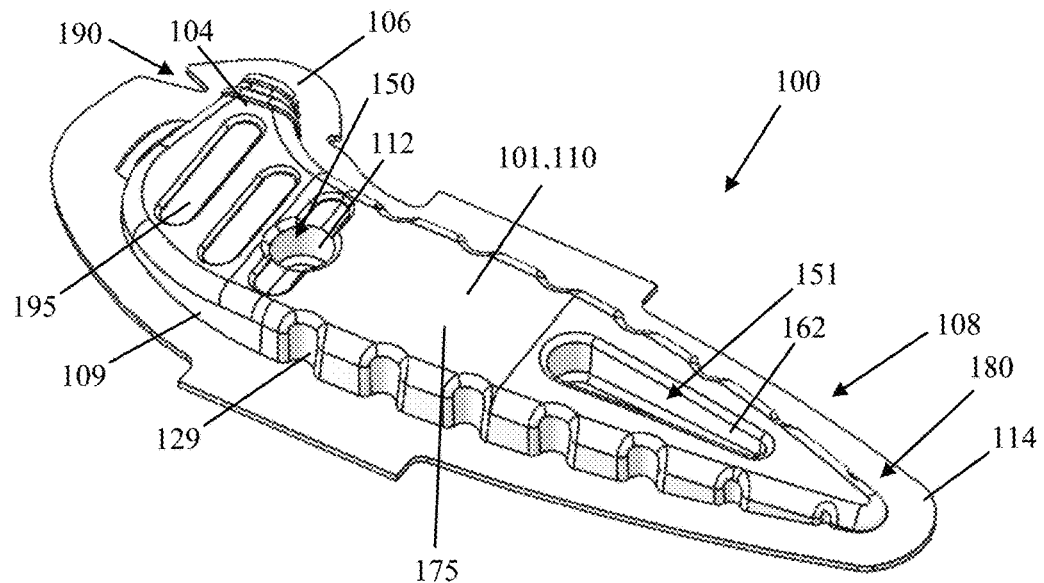
FIG. 1 is a top perspective view of an insect bait stake according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a bait-containing stake, such a bait stake adapted to attract and kill ants. The stake comprises a body or housing consisting of two halves that may have mirrored profiles, or be mirror images of one another. When the two halves are sealed together or otherwise joined, they form an interior reservoir that is filled with insecticide, as well as an exterior stake-shaped body portion. The stake halves are adhered to one another along their abutting surfaces to form a layered or laminated stake. A bottom of the stake, including a lower portion of the fluid-containing reservoir, is adapted to be driven into the ground by a user. To open the reservoir and provide insects with access to the insecticide contained therein, the user tears, cuts or otherwise removes a tab from the body for opening an inlet or access passage between an exterior environment and the reservoir.

More specifically, in one embodiment, the bait stake is formed from a monolithic housing, for example, a blow-molded polymer housing. The housing defines an internal reservoir, and an exterior shape adapted to penetrate the ground at least on a bottom end thereof. One of more anti-crushing or anti-collapsing structures are defined by the housing and extend through the reservoir, joining its sides together through the reservoir at least as the stake is gripped by a user and/or is compressed after penetrating the ground. In particular, the anti-crushing or anti-collapsing structures are sized and located so as to retain the general form of the housing as it is inserted into the ground. In one embodiment, each anti-crushing structure includes opposing protrusions extending from each of two sides of the housing. The protrusions are sized and located to abut one another either in an unstressed state of the housing, or after the application of, for example, a gripping or compressive force on the housing resulting in the partial deformation of the housing.

Referring generally to FIGS. 1-4, an insect bait stake 100 according to an embodiment of the present disclosure is shown. The bait stake 100 includes a housing or body 101 defining an internal cavity 102 (see FIG. 2). The internal cavity 102 is arranged in communication with an access passageway or inlet opening 104. The inlet opening 104 is sized to permit the entry and exit of insects (e.g., ants) therethrough for accessing bait (e.g., a liquid bait) arranged within the internal cavity 102. A tab 106 is defined proximate an end of the inlet opening 104, and defines a segment of the housing 101 adapted to be removed (e.g., cut or torn by a user) in order to open a closed end of the inlet opening. In the exemplary embodiment, the housing 101 comprises a polymer container formed, for example, by blow-molding a polymer film as will be set forth in greater detail herein.

The housing 101 includes a first housing half 108 defining a first sidewall 110, and a second housing half 118 defining an opposing and generally parallel second sidewall 120. The first and second housings or housing halves 108,118 each define an at least partially vertical sidewall or perimeter wall 109,119 extending circumferentially about the housing 101. In one embodiment, the perimeter walls are oriented generally perpendicular to the sidewalls 110,120. The first and second opposing sidewalls 110,120 and the perimeter wall 109,119 define the internal cavity 102. The first and second housing halves 108,118 are joined at a shared joining wall or flange 114 defined about a lateral perimeter of the housing 101. The tab 106 is at least partially defined in the flange 114. A score or notch 190 is made in the flange 114 on either side of the tab 106 to indicate the portion of the tab 106 that should be removed to open the inlet passage 104. In some embodiments, the notch 190 facilitates breaking off, cutting or tearing of the tab 106 from the housing 101. As referred to herein, a first end of the container 100 or housing 101 constitutes the intended ground-penetrating portion opposite the tab 106, with the end proximate the tab referred to as a second end of the housing or container.

The housing 101 includes at least one anti-crushing element or structure 150,151 adapted to prevent or limit the deformation of the housing by a user while inserting the bait stake into the ground. In the exemplary embodiment, a first anti-crushing element 150 is defined by a pair of first protrusion 112,122 extending from respective ones of the opposing sidewalls 110,120 and into the internal cavity 102. The protrusions 112,122 form corresponding recesses 113, 123 in the exterior surfaces of respective sidewalls 110,120. The protrusions 112,122 extend in a direction generally toward one another in an uncompressed state of the housing 101.

A predetermined gap or space may be defined between the protrusions 112,122 as a result of the manufacturing process of the housing 101. However, upon gripping the housing 101, deformation of the housing 101 may cause relative motion between the sidewalls 110,120 in a direction(s) of compression C (or a direction of likely collapse), eliminating the any such gap. After sufficient compression, ends of the protrusions 112,122 will engage with one another, limiting further deformation or compression of the housing 101 in the indicated direction. In other embodiments, no gap (or no appreciable gap) exists between the protrusions 112,122 in an uncompressed or unstressed state of the housing 101.

A second anti-crushing element or structure 151 is defined proximate the bottom or ground engaging portion of the housing 101 (i.e., the first end). Specifically, the second anti-crushing element or structure 151 includes opposing elongated ribs 162,172 extending from a respective one of the first and second sidewalls 110,120. The ribs 162,172 extend in a longitudinal direction of the housing 101 and terminate adjacent a ground penetrating tip 180 of the housing. The second anti-crushing structure 151 is operative to prevent the collapse of the housing 101 upon gripping by a user, as well as during insertion into the ground, by way of example. As set forth above with respect to the protrusions 112,122, a predetermined gap or space may be defined between the protrusions 162,172 as a result of a manufacturing operation of the housing 101. This gap is eliminated upon gripping and/or insertion of the housing 101 into the ground. In other embodiments, no gap (or no appreciable gap) existing between the protrusions 162,172.

Figure 3:
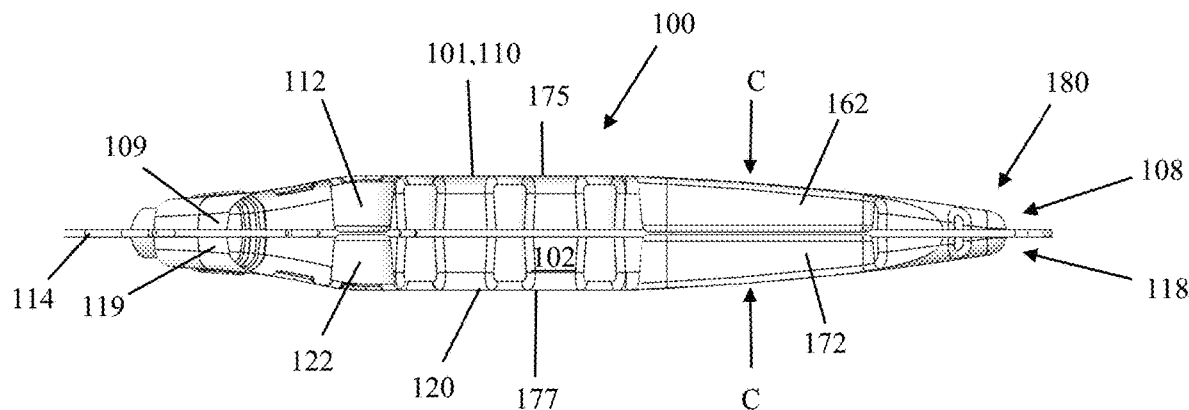
FIG. 3 is a partial side cross-sectional view of the bait stake of the preceding figures.

As shown in FIG. 3, the housing 101 of the stake 100 comprises a generally tapered profile approaching its ends, with a cross-section of the internal cavity 102 being greater toward the center, and decreasing (e.g., in each of two orthogonal dimensions) approaching the first and second ends. The internal cavity 102 extends into the tapered, or V-shaped, ground penetrating tip 180 at the first end. In this way, a greater volume of liquid or bait may be retained by the container 100, as distinct from prior art arrangements, which limit the cavity or reservoir to above-ground portions. Between the first and second ends of the housing 101, the first and second sidewalls 110,120 define respective generally planar, or planar, exterior portions 175,177, maximizing the volume of the internal cavity 102.

The perimeter walls 109,119 each comprise a plurality of aligned recesses 129 (or protrusions with respect to an internal perspective) formed therein and extending in the direction of the internal cavity 102. The recesses 129 define a scalloping, or are formed in a scalloping or repeating pattern, extending down respective lateral sides of each of the first and second housings halves 108,118. The recesses 129 provide a gripping surface, aiding in the insertion of the stake 100 into the ground by a user. The recesses 129 also provide further structural strengthening and stiffening of the housing 101. Further still, the resulting internal stepped profile within the internal cavity 102 aids insects (e.g., ants) in moving from the inlet passage 104 downward and into the bottom end of the cavity, and then back upwards after consuming the bait. This stepped internal profile also reduce the chances that the insects will drown in the bait, which is desirable as it is intended that the insects will consume the bait, and survive long enough to carry the bait back to the nest and deliver a dose to a remainder of a colony. Additional stiffening recesses 195 are formed in opposing sidewalls 110,120 of the first housing and the second housing halves 108,118 proximate the second end, by way of example only.

As set forth above, the housing 101 may be formed by a blow-molding process of manufacture. Specifically, each mirror-image housing half 108,118 may by formed from a folded single sheet of polymer film. The halves 108,118 are brought into abutment and sealed to one another along a desired sealing line that corresponds with the interior circumferential edges the flange 114 of the housing 101. An opening is left in the sealing line to provide a fluid input channel. The central area surrounded by the sealed outer edges that will form the internal cavity 102 is also unsealed. The folded piece of film material sealed is then placed into a two-sided mold that is pre-formed to create the desired bait pack or housing shape including the inner contour of the internal cavity 102, as shown in FIGS. 2-5. Air and product are introduced through a round feature at the rear of the pack. The air forces each half 108,118 of the film material outwardly and into abutment with a respective inner side of the mold, forming the single sealed bait cavity 102 having the desired bait pack shape. Insecticide, for example, is then introduced into the internal cavity 102 through the inlet passage 104, after which the tubular member is removed. The fluid inlet passage 104 and flange 114 are then sealed. When the device is ready for use, a neck portion of the inlet passage 104 projects from a remainder of the housing 101, and terminates in the tab portion 106, or beyond a line defined between the score(s) 190. A bait pack having differently shaped sides would be produced using a different pre-formed mold as would be understood by persons of ordinary skill in the art. However, it is preferred that the two halves have an identical, or near identical, structure for greater ease and simplicity of manufacture.

Figure 2:
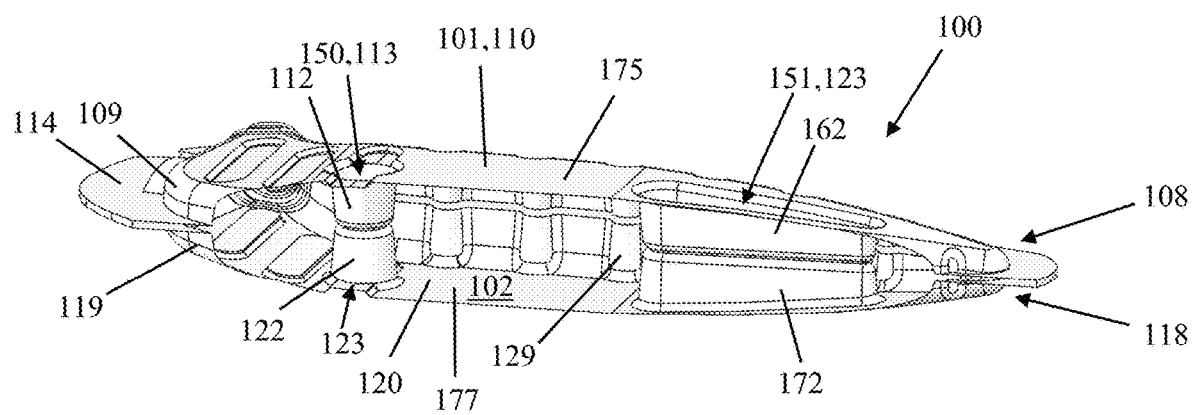
FIG. 2 is a partial side cross-sectional perspective view of the bait stake of FIG. 1.
Figure 4:
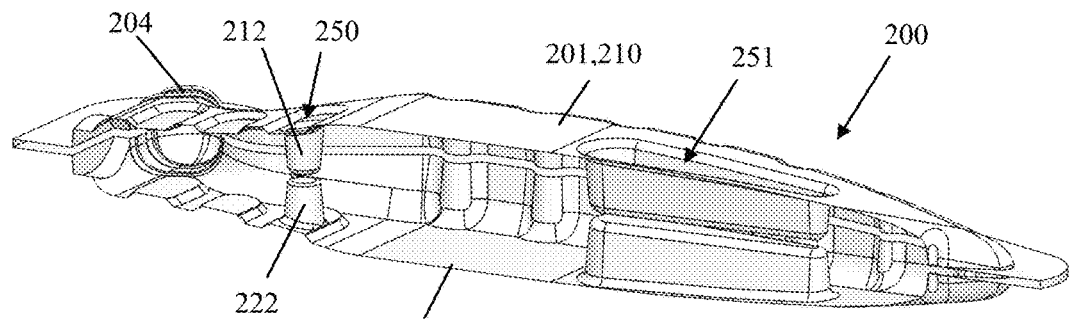
FIG. 4 is a partial side cross-sectional perspective view of a bait stake according to an embodiment of the present disclosure.
Figure 5:
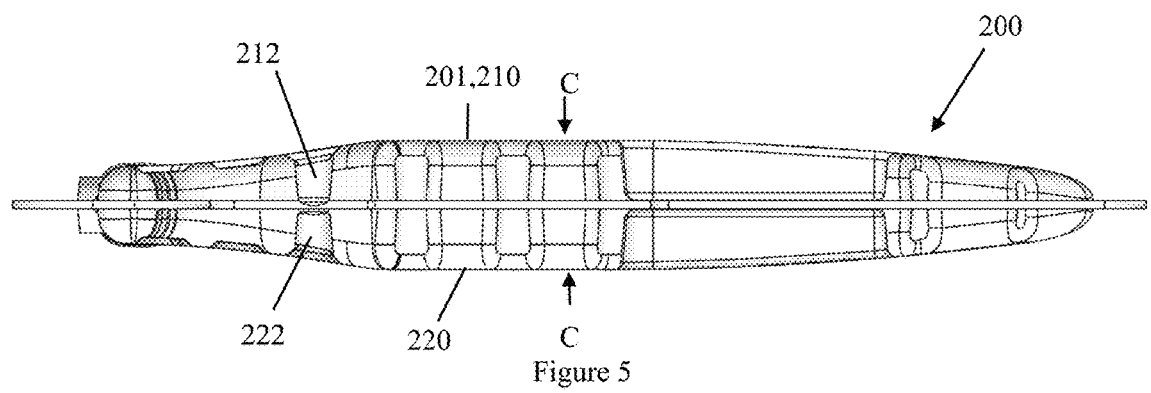
FIG. 5 is a partial side cross-sectional view of the bait stake of FIG. 4.
Figure 6:
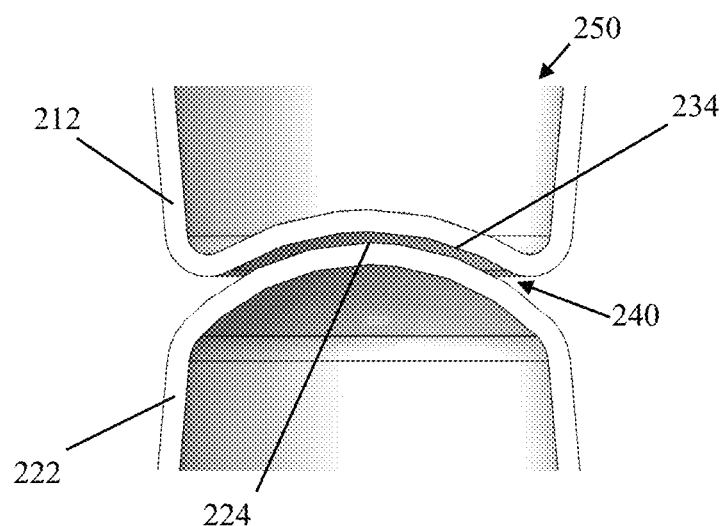
FIG. 6 is a partial cross-sectional view of an interior anti-crush structure of a bait stake according to an embodiment of the present disclosure.

FIGS. 4-6 illustrate an embodiment of a bait stake 200 having features similar to those set forth above with respect to FIGS. 1-3. The description of the common features is not repeated herein in the interest of brevity. As with the embodiment of FIGS. 1-3, the bait stake 200 includes a first anti-crushing element 250 including opposing protrusions 212,222, and a second anti-crushing element 251 in the form of opposing elongated ribs. In the exemplary embodiment, the protrusions 212,222 comprise complementary mating surfaces 224,234 defined on opposing ends thereof, as shown in detail in FIG. 6. The mating surfaces 224,234 are adapted to engage with one another. Specifically, the engaged mating surfaces 224,234 define surfaces which oppose one another at least partially in at least one direction normal to the direction(s) of compression C of a housing 201 of the stake 200. In this way, the engaged mating surfaces 224,234 prevent relative lateral motion of the protrusions 212,222 (or sidewalls 210,220) under excessive compressive force placed on the stake 200. In this way, the protrusions 212,222 are prevented form "slipping off" one another under use, thus ensuring the functionality of the anti-collapsing structures. In one embodiment, the engaged mating surfaces 224,234 prevent motion along a plane defined between the mating ends of the protrusions 212,222 (i.e., in all directions within the plane). In other embodiments, the engaged mating surfaces 224,234 prevent motion in at least two lateral directions relative to the relatively vertical direction(s) of compression. Further, after engagement, further compression of the sidewalls results in their pivoting or rotational deflection about the engaging features.

In the exemplary embodiment of FIGS. 4-6, the protrusions 212,222 comprise cylinders, or more specifically, tapered cylinders or cones, and the mating surfaces 224,234 comprise a generally domed-shaped protrusion and recess, respectively. The first anti-crushing element 250, including the protrusions 212,222, is defined in a top or second end of the housing 201 proximate an inlet passage 204. A predetermined gap or space 240 may be defined between the protrusions 212,222 as a result of a manufacturing operation of the housing 201. In other embodiments, no such gap may be present, or the gap may be made as minimal as possible.

It should be understood that the engaging mating surfaces may also be applied to the protrusions 112,122 of the embodiment of FIGS. 1-3, as well as to the surface(s) of the second anti-crushing elements or features 151,251 of either embodiment without departing from the scope of the present disclosure. Further, the mating surfaces of these features may comprise any suitable shape for engaging one another, and define surfaces which at least partially oppose one another in the lateral/longitudinal directions, or directions generally normal to the compressive or crushing direction C indicated in the figures. For example, the mating surfaces may comprise a cylinder and a corresponding cylindrical recess, or any protruding shape and a correspondingly shaped recess.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An insect bait stake, comprising:
    a container defining an internal cavity adapted to hold a quantity of liquid bait, including:
        a first housing defining a first portion of the internal cavity;
        a second housing attached to the first housing and defining a second portion of the internal cavity, a first end of the container formed by the first and second housings tapering approaching the first end and defining a ground penetrating stake end; and
        a tab portion adapted to be removed for exposing the internal cavity to the exterior environment;
    a first anti-crushing element arranged within the internal cavity and between the first housing and the second housing, the first anti-crushing element including a first protrusion and a second protrusion extending oppositely into the internal cavity from respective internal walls of the first and second housings, an end of the first protrusion at least partially received within a recess of the second protrusion in response to relative movement between the first housing and the second housing generated by a compressive force placed on the container for fixing a distance between the first housing and the second housing; and
    a passageway in communication with the internal cavity on a first end thereof, and extending through at least one of the first housing or the second housing to the tab portion.

2. The insect bait stake of claim 1, wherein the first and second protrusions are arranged proximate the first end of the container opposite the tab portion.

3. The insect bait stake of claim 2, wherein the first end of the container formed by the first and second housings comprises a cross section reducing in two dimensions approaching the first end.

4. The insect bait stake of claim 3, wherein a cross-section of the container increases in two dimensions moving from the first end toward the second end.

5. The insect bait stake of claim 4, wherein the first housing and the second housing each define a perimeter wall.

6. The insect bait stake of claim 5, wherein each perimeter wall comprises a plurality of recesses formed therein in the direction of the internal cavity.

7. The insect bait stakes of claim 6, wherein the recesses define corresponding protrusions within the internal cavity, the protrusions extending at least from the intermediate section and into the first end of the container.

8. The insect bait stake of claim 4, wherein an intermediate section of the container has a width and a thickness greater than that of the first end and the second end, the first and second ends arranged on respective sides of the intermediate section.

9. The insect bait stakes of claim 6, wherein the recesses define a scalloping formed in respective lateral sides of each of the first and second housings.

10. The insect bait stake of claim 2, further comprising a second anti-crushing element, discrete and separated from the first anti-crushing element, and arranged within the internal cavity and between the first housing and the second housing.

11. The insect bait stake of claim 10, wherein the second anti-crushing element includes a second pair of protrusions extending oppositely into the internal cavity from respective internal walls of the first and second housings, the second pair of protrusions defining ends adapted to abut one another within the internal cavity in response to relative movement between the first housing and the second housing, at least a portion of a first protrusion of the second pair of protrusions being received within a recess defined in a second protrusion of the second pair of protrusion in response to the compressive force placed on the container.

12. The insect bait stake of claim 11, wherein the second pair of protrusions are arranged proximate a second end of the container adjacent the tab portion.

13. The insect bait stake of claim 11, wherein the first and second housings define opposing generally planar sections arranged directly between the first and second anti-crushing elements along a longitudinal direction of the container.

14. The insect bait stake of claim 2, wherein the first and second protrusions have an elongated profile extending between the first end of the container and a second end of the container proximate the tab portion.

15. The insect bait stake of claim 1, wherein the container is a blow-molded polymer film container.

16. The insect bait stake of claim 1, wherein the container further comprises a flange extending generally perpendicularly from and between the perimeter walls of the first and second housings, the tab portion at least partially defined by the flange.

17. The insect bait stake of claim 1, further comprising a plurality of stiffening recesses formed in opposing walls of the first housing and the second housing.

18. The insect bait stake of claim 1, wherein, with the end of the first protrusion at least partially received within and abutting the recess of the second protrusion, the end of the first protrusion and the recess of the second protrusion oppose one another in a plurality of directions each normal to a direction of engagement between the first protrusion and the second protrusion in response to the compressive force.

19. A container, comprising:
a housing including opposing top and bottom walls defining an internal cavity extending between a first end of the housing and a second end of the housing, the first end of the housing formed by the opposing top and bottom walls comprises a tapered profile having a reducing cross section approaching the first end and defining a ground penetrating stake end; and
a pair of anti-crushing structures defined on at least one of the two opposing walls and extending into the internal cavity, each anti-crushing structure including a pair of opposing protrusions adapted to abut one another and limit motion between the opposing walls in response to a compressive force placed on the housing, each pair of opposing protrusions including a first protrusion and a second protrusion, the first protrusion at least partially engaging within a recess defined by the second protrusion in response to the compressive force placed on the housing.

20. The container of claim 19, further comprising a plurality of stiffening ribs defined on lateral walls of the housing, the lateral walls and stiffening ribs defined between the opposing top and bottom walls at least partially around a perimeter of the housing.

21. An insect bait stake, comprising:
a unitary container defining an internal cavity adapted to hold a quantity of liquid bait, including:
a first half including a first sidewall defining a first portion of the internal cavity;
a second half integrally joined with the first half and including a second sidewall opposing the first sidewall and defining a second portion of the internal cavity, the first and second sidewalls tapering toward a first end of the container and defining a ground penetrating tip of the stake;
a tab portion adapted to be removed for exposing the internal cavity to the exterior environment;
an anti-crushing element arranged within the internal cavity, including:
a first protrusion extending from an interior surface of, and formed integrally with, the first sidewall;
a second protrusion extending from an interior surface of, and formed integrally with, the second sidewall, the first and second protrusions abutting one another for fixing a distance between the first sidewall and the second sidewall under a compressive force placed on exposed exterior surfaces of the first sidewall and the second sidewall; and
a passageway in communication with the internal cavity on a second end thereof, and extending through at least one of the first half or the second half to the tab portion.

22. The insect bait stake of claim 21, wherein, with the first and second protrusions abutting one another in response to the compressive force placed on the container, surfaces of the first and second protrusions oppose one another in a plurality of directions each normal to a direction of the compressive force and are adapted to prevent relative motion between the first sidewall and the second sidewall of the container in the plurality of directions.

* * * * *